(12) United States Patent
Hur et al.

(10) Patent No.: US 7,020,097 B2
(45) Date of Patent: Mar. 28, 2006

(54) ADAPTIVE WIRELESS NETWORK SYSTEM COMPRISING CENTRAL OPTIMIZER AND METHOD THEREOF

(75) Inventors: Jeen Hur, Taejon (KR); Seong-Su Park, Taejon (KR); Seok-Bong Hyun, Taejon (KR); Kyu-Ha Baek, Taejon (KR); Hee-Tae Lee, Taejon (KR)

(73) Assignee: Electronics and Telecommunications Research Institute, (KR)

( * ) Notice: Subject to any disclaimer, the term of this patent is extended or adjusted under 35 U.S.C. 154(b) by 948 days.

(21) Appl. No.: 10/033,421

(22) Filed: Dec. 28, 2001

(65) Prior Publication Data

US 2002/0114304 A1    Aug. 22, 2002

(30) Foreign Application Priority Data

Dec. 30, 2000    (KR) ............................... 2000-87545

(51) Int. Cl.
*H04L 12/26*    (2006.01)
(52) U.S. Cl. ................... 370/252; 370/338; 370/465
(58) Field of Classification Search .................. None
See application file for complete search history.

(56) References Cited

U.S. PATENT DOCUMENTS

| 4,412,326 | A | 10/1983 | Limb ........................ 370/85 |
| 4,543,574 | A | 9/1985 | Takagi et al. ............ 340/825.5 |
| 5,864,558 | A | 1/1999 | Johnson .................... 370/445 |
| 6,243,392 | B1* | 6/2001 | Uemura et al. ............ 370/465 |
| 6,567,420 | B1* | 5/2003 | Tiedemann et al. ......... 370/468 |
| 6,646,987 | B1* | 11/2003 | Qaddoura ................. 370/231 |
| 6,845,091 | B1* | 1/2005 | Ogier et al. ............... 370/338 |
| 2003/0045237 | A1* | 3/2003 | Gardner et al. ............ 455/63 |

\* cited by examiner

*Primary Examiner*—Chau Nguyen
*Assistant Examiner*—Anthony Sol
(74) *Attorney, Agent, or Firm*—Blakely Sokoloff Taylor & Zafman

(57) ABSTRACT

In the adaptive wireless network system having a central optimizer and a method thereof, and in the record medium capable of being read through a computer having a writing of a program to realize the inventive method, in which information for a use wave environment of a corresponding subnet is gained from an access point regardless of a sort of wireless communication instruments so as to apply an optimum transmission/reception type of the corresponding subnet thereto; the system includes an optimizing unit for selecting optimum transmission/reception types of sub networks and transmitting them; an access point determining unit for providing node activity representative data and activity representative data of access point itself, to the optimizing unit, and determining it as the optimum transmission/reception type; and a communication node determining unit for re-determining its own transmission/reception type according to a requirement of the access point determining unit.

15 Claims, 9 Drawing Sheets

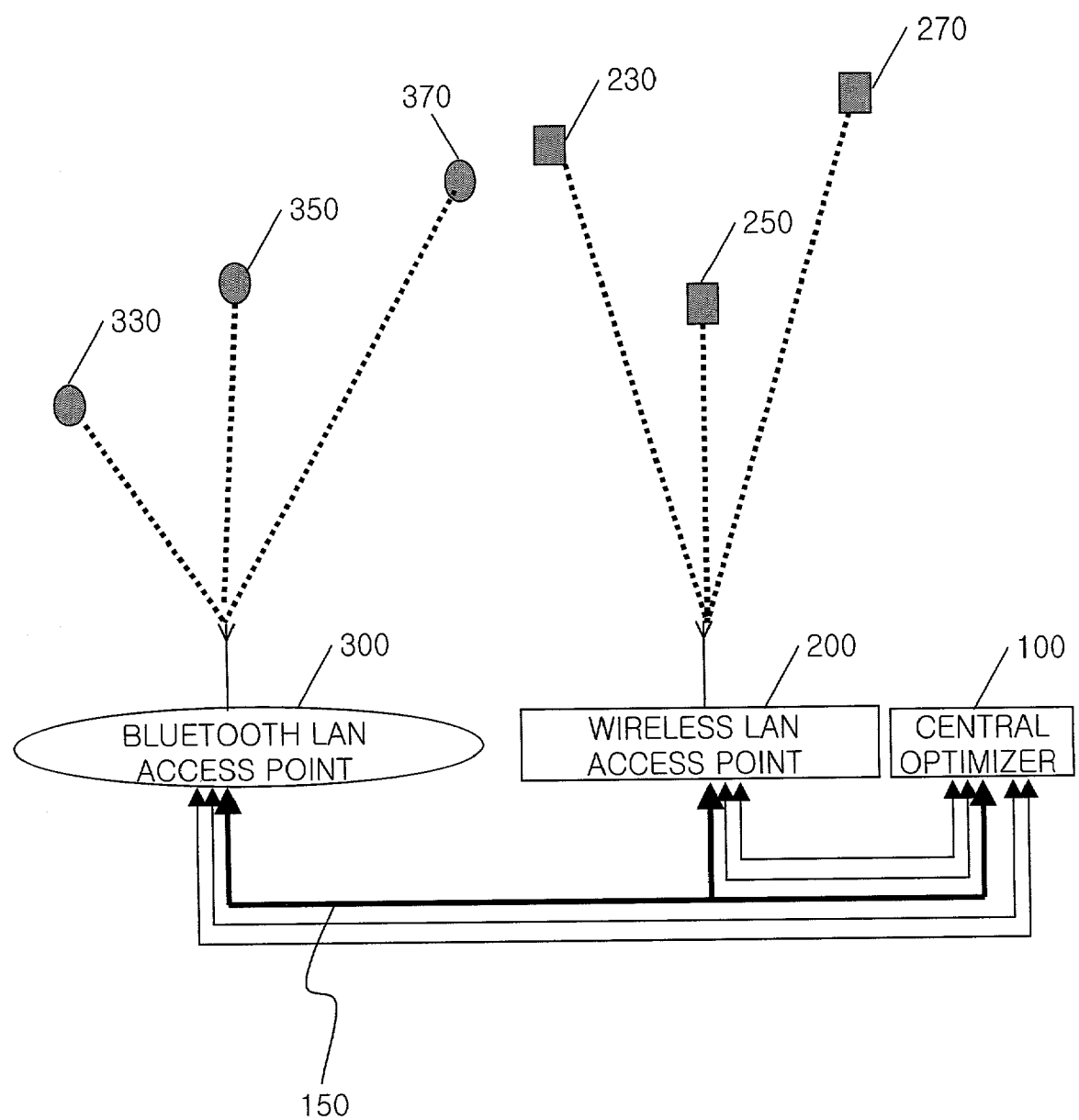

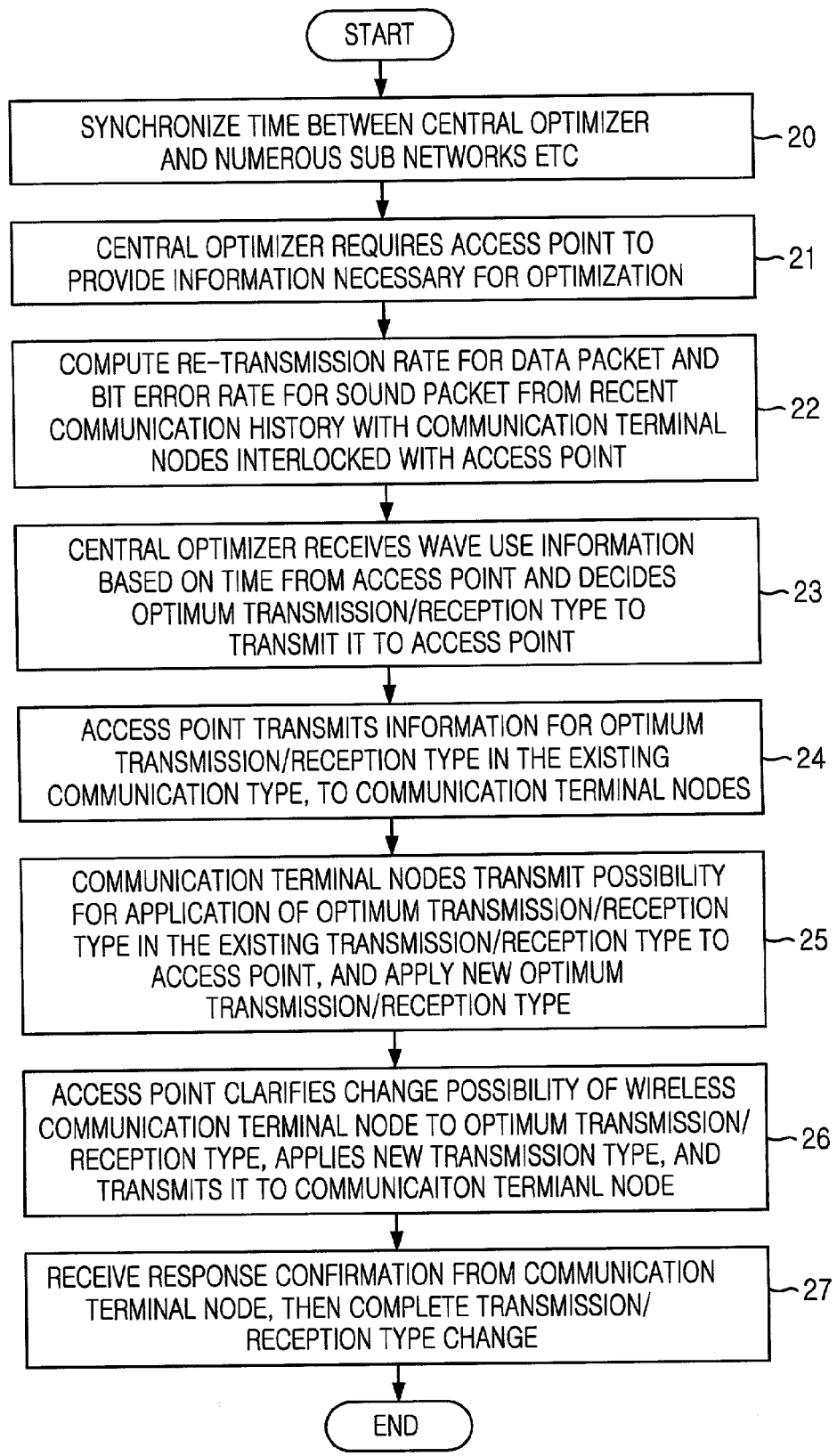

FIG. 3

| NODE<br>Ti=0, Δt=2500μs | 1-1 | 1-2 | 1-3 | 1-4 | 2-1 | 2-2 | 2-3 | 3-1 | 3-2 | 3-3 | 3-4 |
|---|---|---|---|---|---|---|---|---|---|---|---|
| TRANSMISSION NUMBER (ACCESS POINT) | NON (YES) | NON (YES) | YES (NON) | NON (YES) | NON (YES) | NON (YES) | YES (NON) | YES (NON) | NON (YES) | YES (NON) | NON (YES) |
| PACKET TYPE(DIVISION) | 1 | 1 | 1 | 1 | HV3 | DM3 | DM5 | DM1 | DM2 | DM1 | DM1 |
| FEC SORT | NA | NA | NA | NA | No | 2/3 | 2/3 | 2/3 | 2/3 | 2/3 | 2/3 |
| ACCESS POINT TRANSMISSION POWER(dBm) | 20 | 20 | 20 | 20 | 0 | -10 | 0 | 0 | 0 | 0 | 0 |
| ACCESS POINT RECEPTION POWER(dBm) | -40 | -50 | -60 | -60 | -40 | -50 | -60 | -40 | -50 | -60 | -60 |
| NODE TRANSMISSION POWER (dBm) | 20 | 20 | 20 | 20 | 0 | 0 | 0 | 0 | 0 | 0 | 0 |
| NODE RECEPTION POWER (dBm) | -41 | -49 | -60 | -60 | -51 | -59 | -60 | -41 | -49 | -60 | -60 |
| ERROR RATE (BER or PER) | 20% (PER) | 33% (PER) | 5% (PER) | NA | 0.1% (BER) | 15% (BER) | 40% (BER) | 16% (BER) | 40% (BER) | 40% (BER) | 25% (BER) |

FIG. 4

| NODE<br>Ti=0, Δt=2500μs | 1-1 | 1-2 | 1-3 | 1-4 | 2-1 | 2-2 | 2-3 | 3-1 | 3-2 | 2-3 | 2-3 |
|---|---|---|---|---|---|---|---|---|---|---|---|
| PACKET LENGTH | 1197 | 1197 | 1197 | 1197 | 366 | 366 | DM3 | 366 | 1616 | 366 | 991 |
| FEC EXISTENCE/SORT | NA | NA | NA | NA | No | 2/3 | 2/3 | 2/3 | 2/3 | 2/3 | 2/3 |
| ACCESS POINT TRANSMISSION POWER (dBm) | 20 | 20 | 20 | 20 | −10 | 0 | 0 | 0 | 0 | 0 | 0 |
| NODE TRANSMISSION POWER (dBm) | 20 | 20 | 20 | 20 | 0 | 0 | 0 | 0 | 0 | 0 | 0 |

ADAPTIVE WIRELESS NETWORK SYSTEM COMPRISING CENTRAL OPTIMIZER AND METHOD THEREOF

FIELD OF THE INVENTION

The present invention relates to an adaptive wireless network system having a central optimizer and a method thereof; and more particularly, to an adaptive wireless network system having a central optimizer and a method thereof, the central optimizer being for minimizing an interference between homogeneous or heterogeneous subnets operating at the same band so as to make the heterogeneous subnets coexisting, and being also provided for a performance improvement of the respective subnets and an overall network, and further relates to a record medium capable of being read through a computer having a writing of a program to realize the inventive method.

PRIOR ART OF THE INVENTION

Recently it is being accelerated an activation of a wireless communication industry in a concern and an expectation for a mobile wireless communication industry, and under such background it is being progressed a research for an interference obstacle caused by a wireless instrument including base and mobile wireless stations. A Bluetooth BT highlighted recently is the system for executing a high speed hopping of 1,600 times or 3,200 times per second and is one out of personal area network instruments based on a relatively short distance, about 10 m.

In its application a communication application among a notebook, a cellular phone, a head set and computer peripheral instruments is representative, and a replacement for a sound communication and cable is a main target. Such communication through the Bluetooth BT commonly owns a 2.45 GHz ISM band together with a communication through an IEEE 802.11b DSSS (Direct Sequence Spread Spectrum) wireless LAN, thus it may be caused some communication obstacle due to an interference in case that the number of the use instruments is increased. Therefore, a preamble of the wireless LAN and a length of a header are changed from 192 μs to 96 μs, while, one long packet is divided into several numbers of short packets, to then transmit them and to thereby lessen an influence of the interference. However, it is difficult to apply a packet division transmission technique because of a difficulty to know a heterogeneous interference wireless wave environment, and there is also a problem that a loss occurs by a repetition of frequency and time of the bluetooth and wireless LAN packets.

SUMMARY OF THE INVENTION

Accordingly, the present invention is directed to an adaptive wireless network system having a central optimizer and a method thereof that substantially obviate one or more of the limitations and disadvantages of the related art.

A primary object of the present invention is to provide an adaptive wireless network system having a central optimizer and a method thereof, in which information for a use wave environment of a corresponding subnet is gained from a corresponding access point regardless of a sort of wireless communication instruments so as to apply an optimum transmission/reception type of the corresponding subnet thereto, and to further provide a record medium capable of being read through a computer having a writing of a program to realize the inventive method.

To achieve these and other advantages, and in accordance with the purpose of the present invention, a system for embodying an adaptive wireless network by using a central optimizer includes an optimizing unit for selecting optimum transmission/reception types of sub networks and transmitting them; an access point determining unit for providing node activity representative data and activity representative data of access point itself to the optimizing unit, and determining it as an optimum transmission/reception type; and a communication node determining unit for re-determining its own transmission/reception type according to a requirement of the access point determining unit.

While, in the present invention, a method for embodying the inventive system of the adaptive wireless network using a central optimizer includes the steps of: a) selecting optimum transmission/reception types of sub networks, and transmitting them; b) providing node activity representative data and activity representative data of access point itself to the optimizing unit, and determining it as an optimum transmission/reception type; and c) re-determining its own transmission/reception type according to a requirement of the access point determining unit.

Meanwhile, in accordance with the present invention, a system having an equipment of a processor to embody an adaptive wireless network by using a central optimizer, includes a first function of selecting optimum transmission/reception types of sub networks, and transmitting them; a second function of providing node activity representative data and activity representative data of access point itself to the optimizing unit, and determining it as an optimum transmission/reception type; and a third function of re-determining its own transmission/reception type according to a requirement of the access point determining unit.

BRIEF DESCRIPTION OF THE DRAWINGS

The above and other objects and features of the instant invention will become apparent from the following description of preferred embodiments taken in conjunction with the accompanying drawings, in which:

FIG. 1 depicts a block diagram of an adaptive wireless network system having a central optimizer in one embodiment of the present invention;

FIG. 2 illustrates one exemplary flowchart for an adaptive wireless network system having an inventive optimizer;

FIG. 3 is one exemplary table of sub network activity representative data obtained from an adaptive wireless network system having an inventive optimizer;

FIG. 4 is one exemplary table of an optimum transmission/reception type selected by a central optimizer of an adaptive wireless network system with which an inventive optimizer is equipped;

PREFERRED EMBODIMENT OF THE INVENTION

Figure 5:
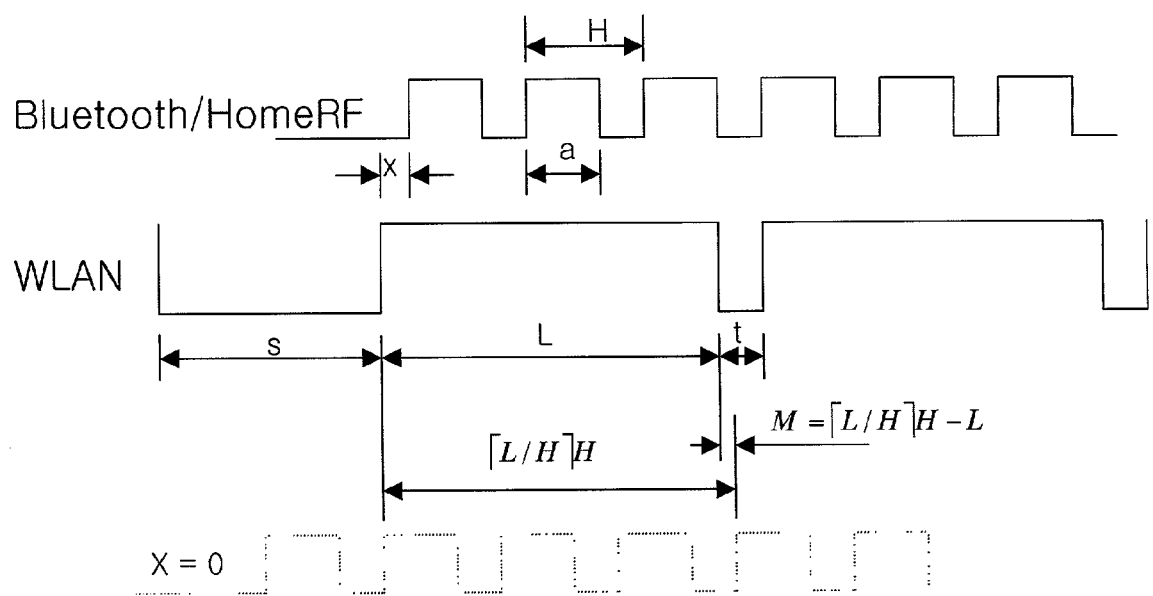
FIG. 5 represents a timing diagram of wireless LAN and bluetooth packets in accordance with the present invention.

Hereinafter, preferred embodiments of the present invention will be described in detail with reference to the accompanying drawings.

FIG. 1 is an exemplary block diagram of an adaptive wireless network system having a central optimizer in accordance with the present invention.

As shown in FIG. 1, a central optimizer 100 is communicate-connected with a wireless RAN access point 200 and a bluetooth LAN access point 300. The wireless LAN access point 200 is interlocked with wireless LAN communication terminal nodes 230, 250, 270, and the bluetooth LAN access point 300 is interlocked with bluetooth LAN communication terminal nodes 330, 350, 370. Herewith the number of the communication terminal nodes is shown as a small quantity for instances, but the actual maximum number of the nodes all interlocked with the bluetooth and the wireless LAN is decided by their standard.

The central optimizer 100 transfers a command for requiring subnet wave use data depending upon a time, to access points to be later mentioned, namely, the wireless LAN access point 200 and the bluetooth LAN access point 300, and selects optimum transmission/reception types of corresponding sub networks for an escape from an interference of the subnet wave use data provided by the access points 200, 300, and also provides optimum transmission/reception type data to the corresponding access points 200, 300 in order to determine a specific subnet as the selected optimum transmission/reception type.

The access points 200, 300 transfer the node activity representative data provided from the corresponding wireless communication nodes which depend upon the time, and the activity representative data of the access point itself, to the central optimizer 100, by the requirement of the central optimizer 100, and determine the wireless communication nodes, namely, the wireless LAN communication terminal nodes 230, 250, 270 and the bluetooth LAN communication terminal nodes 330, 350, 370, on the basis of the optimum transmission/reception type data provided from the central optimizer 100.

The wireless LAN communication terminal nodes 230, 250, 270 and the bluetooth LAN communication terminal nodes 330, 350, 370 provide data which represent an activity of node itself containing an RSSI (Receiver Signal Strength Indicator), to the corresponding access point 200, 300, by the requirement of the wireless LAN access point 200 and the bluetooth LAN access point 300 respectively interlocked therewith, and further re-determine its own transmission/reception type.

That is, the wireless LAN wireless communication nodes 230, 250, 270 provide data for representing the activity of the node itself by the requirement of the interlocked wireless LAN access point 200, and the bluetooth wireless communication nodes 330, 350, 370 provide data for representing the activity of node itself by the requirement of the interlocked bluetooth LAN access point 300.

Further, the central optimizer 100 has an installment of an ethernet module (not shown) to be interlocked with the access points 200, 300, and analyzes wave use information provided from the access points 200, 300 and performs a program for selecting the optimum transmission/reception type.

It is described an operation of the adaptive wireless network system having the central optimizer based on the construction mentioned above referring to FIG. 2, as follows.

FIG. 2 is one exemplary flowchart for the adaptive wireless network system having the inventive optimizer.

First, the central optimizer 100 synchronizes to the access points 200, 300 so that a relative hour between sub networks coincides with each other, and after that, requires the access points 200, 300 to collect information necessary for an optimization for a constant time Δt from a specific time Ti and to provide it with ΔTi interval, in a step 21. Then, in a step 22, the access points 200, 300 compute a re-transmission rate from the respective communication terminal nodes 230, 250, 270, 330, 350, 370 about a data packet, and require the node to perform a sound packet transmission test about the sound packet, in a recent communication history with the respectively interlocked communication terminal nodes 230, 250, 270, 330, 350, 370. After that, in the step 22 the access points 200, 300 also send a test packet to the nodes and receive it, to thus calculate a bit error rate.

Herewith, preferably, there is no a FEC(Forward Error Correction) or a little of the FEC in the test packet the access point 200, 300 sends to compute the error rate of the nodes, and when the node transmits a result received under an interference or noise environment to the access point, the FEC becomes strong by maximum transmission power then is sent, to thereby lessen an interference effect on the neighborhood of the access points 200,300 which influences upon the bit error rate calculation of the node.

After that, the central optimizer 100 decides an optimum transmission/reception type from the wave use information based on a time, and transmits it to the access points 200, 300, in a step 23. Herewith, the optimum transmission/reception type contains transmission outputs and packet types of the access points and the wireless communication nodes. Then the access points transmits information for the optimum transmission/reception type in the existing communication type, to the wireless communication nodes 230, 250,270,330,350,370 of the subnets currently participated in, in a step 24.

It is described in the following, a determination procedure for the optimum transmission/reception type, with one example for one node out of the wireless communication nodes 230,250,270,330,350,370 interlocked with one access point. A corresponding node sends a possibility for an optimum transmission/reception type application in the existing transmission/reception type, to a corresponding access point, in a step 25. The corresponding access point sends a clarification signal for confirming it to the node in the existing transmission/reception type, and after that, determines a transmission/reception type with the corresponding node as a new optimum transmission/reception type, in a step 26. The node which received the clarification signal, applies the new optimum transmission/reception type thereto and sends a change completion signal to the access point in a step 27, and the access point confirms it, to whereby complete the transmission/reception type change for the node in a step 28. Such mentioned optimum transmission/reception type determining method is applied to all of the access points 200, 300 and the wireless communication nodes 230,250,270,330,350,370 of the currently participating subnets.

Meantime, in case that a change for one node is not completed within an application completion time decided by a re-transmission etc. caused by a transmission failure in the midst of a procedure of applying a new transmission/reception type, it is classified into a case that a change speed between the existing and new transmission/reception types of the access point is sufficiently rapid, and into its opposite case. In the case the change speed is sufficiently rapid, and if an application of the new optimum transmission/reception type is not completed for all the nodes belonging to the subnet within a determined subnet application completion time, the existing transmission/reception type is applied for the rest nodes which correspond to that subnet and are not applied by the optimum transmission/reception type. In other words, there mixedly are the new optimum transmission/reception type and the existing transmission/reception type.

Meanwhile, in case the mentioned change speed is not sufficiently rapid, and if the application of the new optimum transmission/reception type for all nodes belonging to the subnet is not completed within the determined subnet application completion time, the existing transmission/reception type is applied to all the nodes and the access point belonging to that subnet.

While, if an application of an optimum transmission/reception type in a specific subnet is not completed within an overall network application completion time, the existing transmission/reception type is applied to the rest subnet which belongs to the overall network and is not applied by the optimum transmission/reception type. In a requirement for a change of the optimum transmission/reception type, it can be selectively performed a case that a state of at least one access point which is participated in and activated in the subnet, reaches a specific condition, a case of an automatic execution with a determined time period, and a case executed by a managing person.

FIG. 3 is one exemplary table of sub network activity representative data gotten from the adaptive wireless network system having the inventive optimizer.

In FIG. 3, a first row in a first column contains a time Ti when an access point provides information, and a collection time during Δt, and rows after a second row in the first column represent variables for a packet type, an existence and non-existence of a FEC, transmission and reception power of the access point, transmission and reception power of nodes, and an error rate as a bit error rate or a packet error rate. A column described as a suffix of _I_J of the first row indicates a variable for activity representative data of Jth nodes interlocked with an Ith access point. As an example, respective rows after a third column and a second row represent a packet type in a transmission and reception between a first access point and a second node, an existence and non-existence of a FEC, transmission and reception power of the access point, transmission and reception power of the nodes, and an error rate as a bit error rate or a packet error rate. That is, the central optimizer decides an optimum transmission/reception type according to an algorithm of a program for deciding activity representative data of a sub network and an optimum transmission/reception type to be later described, from the activity representative data of the sub network that the access points provide.

FIG. 4 is one exemplary table of an optimum transmission/reception type selected by the central optimizer of the adaptive wireless network system with which the inventive optimizer is equipped.

In FIG. 4, a first row in a first column contains a time Ti to which an optimum transmission/reception type is applied, and an application completion time Δt, and rows after a second row in the first column represent variables for a packet type, an existence and non-existence of a FEC, transmission power of the access point, and transmission power of nodes. A column described as a suffix of _I_J of the first row indicates a variable for an optimum transmission/reception type of Jth nodes interlocked with an Ith access point. As an example, respective rows after a third column and a second row represent a packet type as an optimum transmission/reception type proposed between a first access point and a second node, an existence and non-existence of a FEC, transmission power of the access point, and transmission power of the node. That is, the access points determine the transmission/reception type of the subnet as the optimum transmission/reception type provided by the central optimizer.

Hereinafter, it is described an algorithm for selecting an optimum packet length among optimum transmission/reception types through a modeling which uses the sub network activity representative data.

FIG. 5 is a timing diagram of wireless LAN and bluetooth packets in accordance with the present invention.

As shown in FIG. 5, it is represented the bluetooth and wireless LAN packet lengths as respective H and L. If disregarding an overhead in a channel switching, a time occupying the channel may be as 366 μs. If a difference in a transmission start time of the bluetooth and wireless LAN packets is x μs, x is a random variable having a value between 0 and 625.

At this time, for the given L, H, and a, the number of bluetooth slots repeated in a time according to a range of an x value, and their probabilities are decided, and a packet loss rate P is obtained from their probabilities, and this can be represented as a function P(L,H,a,Pf) of L, H, a, and Pf.

Herewith, Pf is a probability for using a pass band of a wireless LAN utilized by bluetooth piconet, and is provided by a multiplication of a bluetooth piconet load rate and 20/79. A probability to collide between a single bluetooth piconet and a wireless LAN packet is given as the following numerical expression 1.

$$(1-(1-P_f)^{\lceil L/H \rceil + Sign(a-M)})|a-M|/H +$$
$$(1-(1-P_f)^{\lceil L/H \rceil})(1-|a-M|/H) \qquad \text{[Numerical Expression 1]}$$

Herewith, LCEIL{x} RCEIL is a function for providing an integer not smaller than x, and Sign(x) is a function for providing as 1(−1) in case that an x value is a positive number (negative number) and is the function for providing 0 in case that the x value is 0. A variable M is defined as M=LCEIL{L/H}RCEIL H−L. Therefore, the piconets of the k number performs an interference, a packet loss rate is provided as $1-(1-P)^k$. If the number of interfering piconets is m when a wireless LAN node receives a packet having a length of $L_{ACESS}$ from an access point, and if the number of interfering piconets is n when the access point receives a packet having a length of $L_{ACK}$ from the wireless LAN node, a probability to be failed when the access point receives an ACK packet is provided as the following numerical expression 2.

$$P\_retransmit = 1 - (1 - P(L=L_{ACESS}))^m$$
$$(1 - P(L=L_{ACK}))^n \qquad \text{[Numerical Expression 2]}$$

First, in computing a packet re-transmission probability P_retransmit or actually measuring it, an average time AverageTime when k-dividing a packet having a length of L and sending it, can be predicted by the following numerical expression 3.

AverageTime=s+k (headerTime+payloadTime_k+
P_retransmit s+t)/(1−P_retransmit    [Numerical Expression 3]

Herewith, s indicates the sum of a DIFS time and a slot time SlotTime of 15 times, and L represents the sum of a header time headerTime and a payload time payloadTime_k; the header time, headerTime, being the time necessary for transmitting a header, and the payload time, payloadTime_k, being the time necessary for transmitting a payload k-divided from an original payload having a length of 1500 octet, and t provides the sum of an SIFS time, a header time and an ACK time which is the time necessary for transmitting the ACK, and accords to a wireless LAN standard except of payloadTime.

As its example, in a case of 2.5 GHz direct diffusion spectrum (DSSS) wireless LAN, in other words, a packet transmission time given as the numerical expressions 2 and 3 can be minimized by k-dividing the packet and transmitting it. Namely the transmission rate can be optimized.

It is also described in the following, an optimizing method based on a density of a bluetooth interference instrument, a type of a bluetooth packet, a transmission output of a bluetooth access point, and a transmission output of a wireless LAN access point transmission output.

The number of the bluetooth instruments which interfere a communication between a wireless LAN communication terminal node and a wireless LAN access point, can be calculated by using a simple indoor transfer model [5]. In this model a line-of-sight transfer having a transfer index 2 is assumed for a distance within a first b m from a transmitter, and a transfer index after that is assumed as n. A path loss Lpath is increased by a function of a distance $r^n$, wherein r indicates a distance. Lpath can be represented as the following numerical expression 4 by using decibel.

$$Lpath = 20\text{Log}(4\pi r/\lambda) \text{ for } r < b(m)$$
$$= 20\text{Log}(4\pi b/\lambda) + 33\text{Log}(r/b) \text{ for } r > b(m)$$

[Numerical Expression 4]

Herewith, λ is wavelength(12.24 cm) corresponding to 2.45 GHz in vacuum, and r is a meter unit. At this time, a wall or bottom effect was not considered. Deciding transmission power of bluetooth and wireless LAN communication terminal nodes as respective x_BT and x_DS dBm, and in case that a distance between Jth nodes interlocked with an Ith access point is r_I_J, reception power RSSI_I_J from a corresponding wireless LAN node is provided as x_DS Lpath(r=r_I_J), and interference wave power from a bluetooth distanced by r_interfere from this wireless LAN node is provided as x_BT-Lpath(r=r_interfere). At this time, if assuming that the packet is not lost when the reception power from the wireless LAN node is greater by over Margin (dB) than the interference wave power, a condition to start to generate an interference is like the following numerical expression 5.

x_DS Lpath(r=r_I_J)−Margin=x_BT-Lpath
(r=r_interfere)   [Numerical Expression 5]

Herewith, if RSSI_I_J=x_DS Lpath(r=r_I_J) is satisfied, it can be represented the following numerical expression 6 when r_interfere as a value of r satisfying the numerical expressions 4 and 5 is obtained.

$$r\_interfere = 10^{(x\_BT-RSSI\_I\_J)/20}\lambda/4\pi \text{ for } u > 0$$

[Numerical Expression 6]

$$= b \; 10^{(X\_BT-x\_DS+RSSI+Margin-20\text{Log}(4\pi s/\lambda))/33} \text{ for } u \; 0$$

Herewith, it is u=x_BT−RSSI_I_J+Margin−20 Log(4πs/λ), and RSSI_I_J is an actual measurement reception sensitivity of the wireless LAN node and corresponds to x_DS Lpath(r=r_I_J). That is, if the transmission power of BT and wireless LAN nodes is respective x_BT and x_DS dBm and a condition to start to generate an interference is represented as the numerical expression 5, and in case that a distance between the Ith access point and a Jth wireless LAN node interlocked with that is r_I_J, bluetooth instruments within an interference distance r_BT_interfere represented as the numerical expression 5 obstruct a reception.

Figure 6:
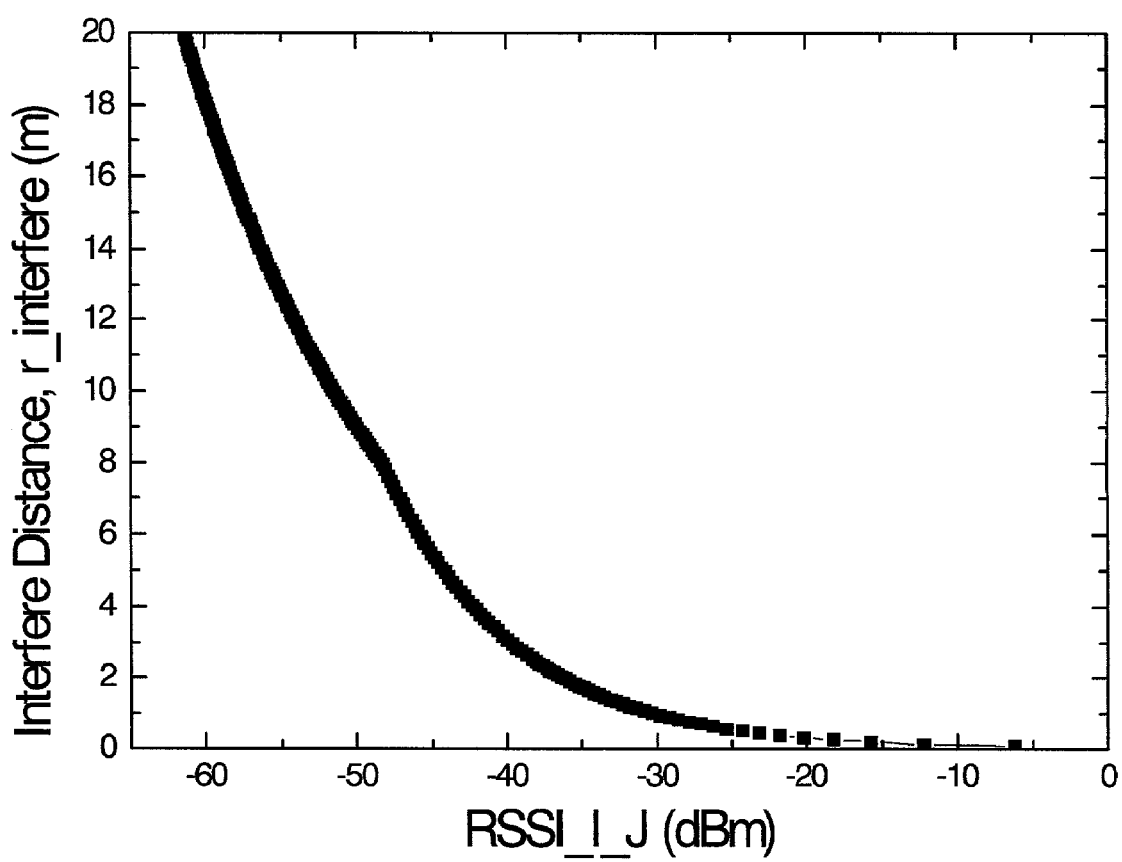
FIG. 6 is a diagram showing a relation of an interference distance through a reception signal strength of a wireless LAN node and a bluetooth in the present invention.

As an example, when in the numerical expression 3, a value of s is provided as 8, and x_BT and x_DS are determined as 0 and 20 dBm as most general values, and also, when a margin is 10 dB as shown in FIG. 6, an interference distance r_interfere (Y axis) can be calculated by a function of a reception signal strength indicator (RSSI) X axis between the wireless LAN nodes interlocked with the access point.

Figure 7:
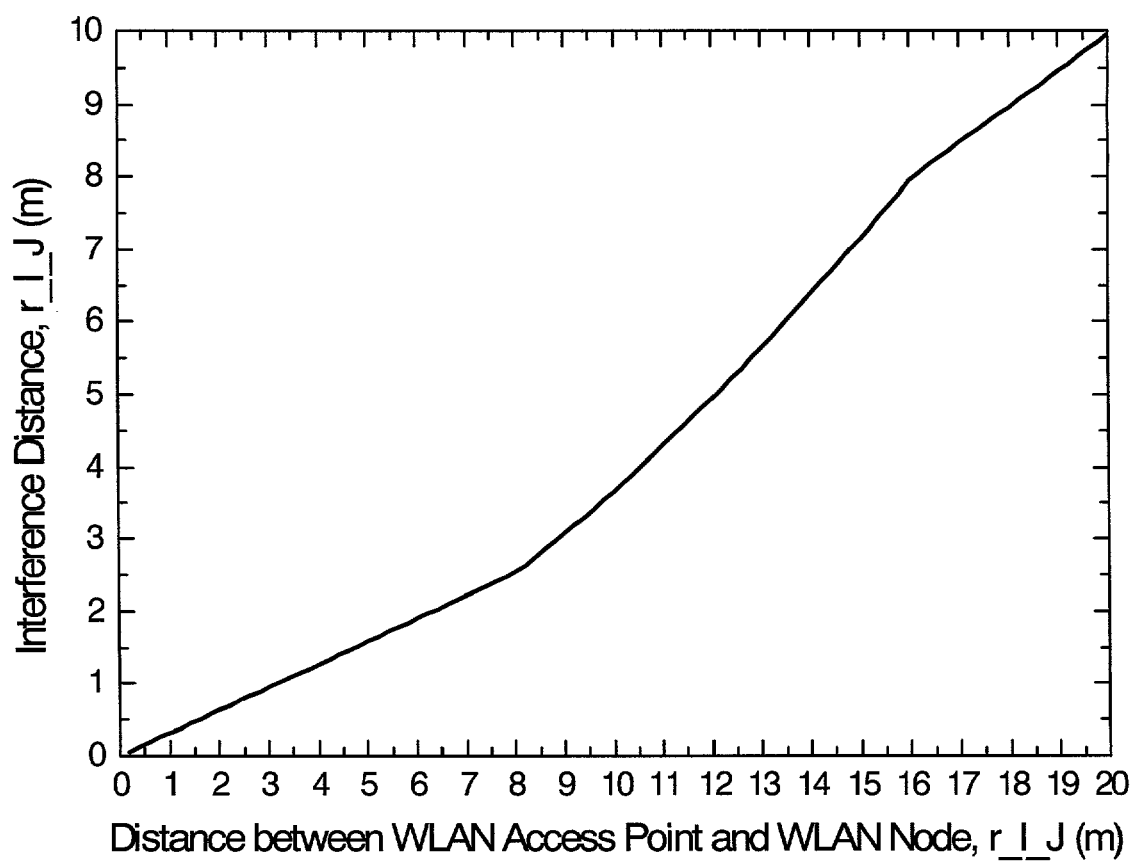
FIG. 7 indicates a diagram showing a relation of a distance between a wireless LAN node and a wireless LAN access point, and of an interference distance through a bluetooth, in the present invention.
Figure 8:
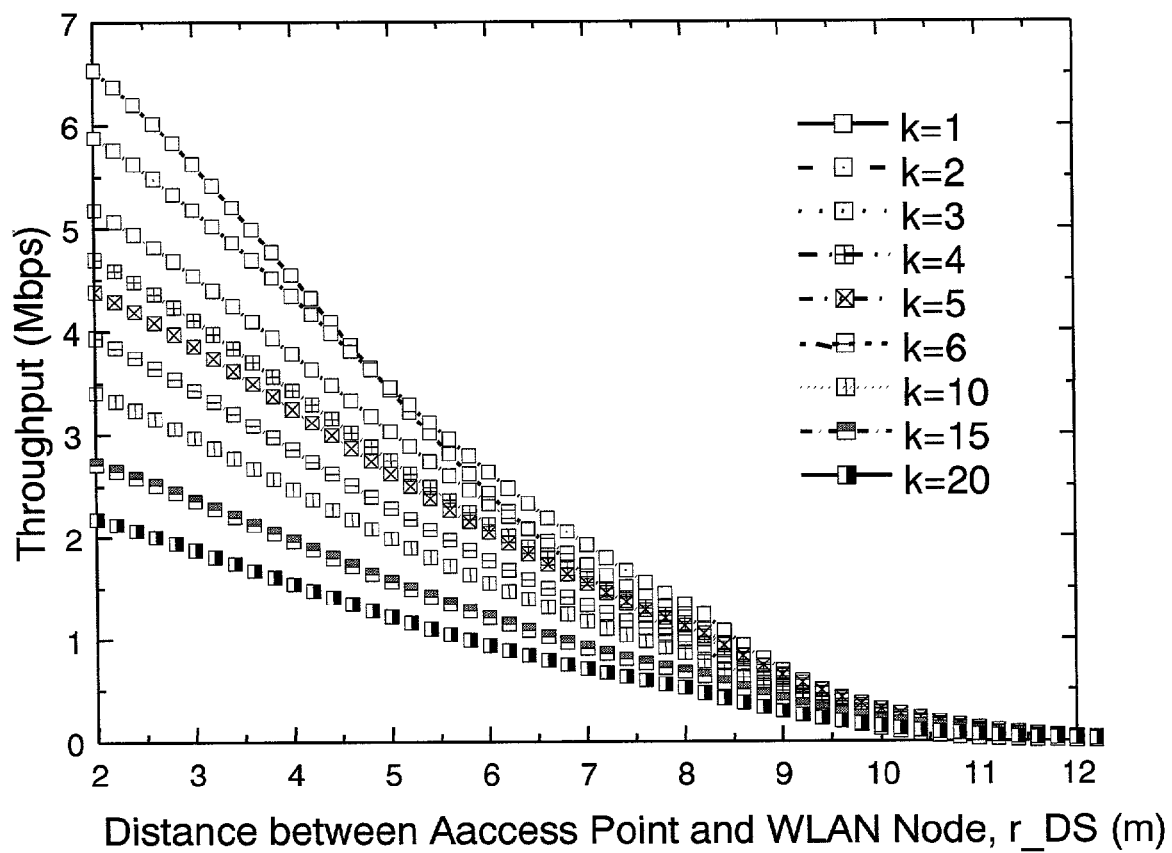
FIG. 8 is a diagram illustrating a relation between the wireless LAN packet division number and a transmission rate in case that there is one bluetooth interference source per 9 m² in an adaptive wireless network system having an inventive optimizer.

At this time, under an assumption that the bluetooth interference instruments are uniformly spread on the neighborhood of the access point and the wireless LAN node in a ratio of one instrument per $d^2$ $m^2$ (n=m), a transmission rate computed from the numerical expressions 2, 3 and 6 is shown in FIGS. 7 and 8.

AS shown in FIG. 7, in a case of d=3, namely, it is shown the transmission rate when there is one interference instrument per 9 $m^2$. It can be noted that, in case that a distance r_I_J between the access point and the wireless LAN node is more than 5 m, it is profitable to transmit a payload bisected from an original payload based on a length 1500 octet, and in case that r_I_J is more than about 9.5 m, it is profitable to transmit a trisected payload.

Figure 9:
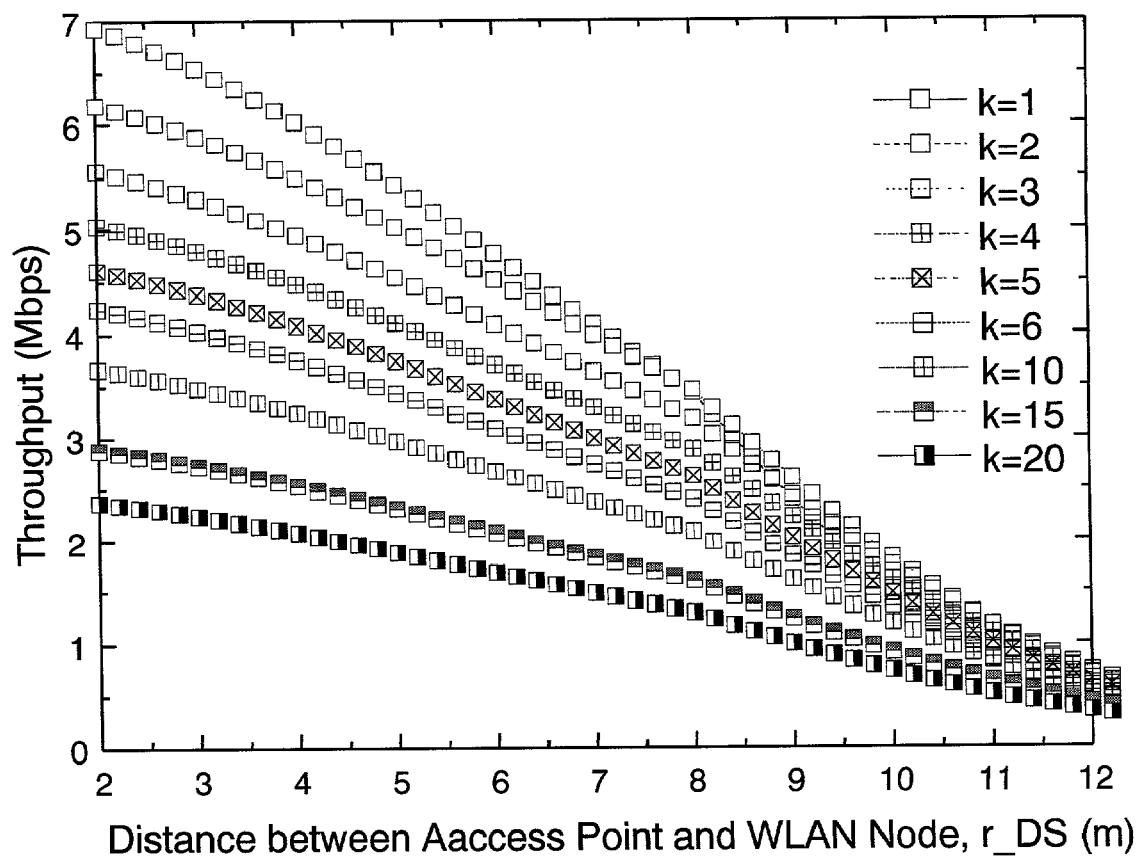
FIG. 9 is a diagram showing a relation between the wireless LAN packet division number and a transmission rate in case that there is one bluetooth interference source per 25 m² in an adaptive wireless network system having an inventive optimizer.

Meantime, as shown in FIG. 8, in a case of d=5, namely, it is shown the transmission rate when there is one interference instrument per 25 $m^2$. It can be thus noted that, in case that r_I_J is more than 8 m, it is profitable to transmit a payload bisected from the original payload based on the length 1500 octet, and in case that r_I_J is more than 11 m, it is profitable to transmit a trisected payload. Therefore, not only, a density of the bluetooth interference instrument interlocked with the bluetooth and the bluetooth access point, and a distance between the access point and the wireless LAN node, but also an optimum packet length becomes different according to transmission/reception power of the wireless LAN nodes. While, the interference distance has a relation of the numerical expression 5 with the transmission power of the wireless LAN access point and the RSSIs of the wireless LAN nodes. For instances, an increase of the transmission power of the wireless LAN access point increases a distance switched in the transmission rate in FIG. 9. Thus, when they are obtained reception power, an error rate of data without a FEC, information for the number m and n of interference instruments which interfere a communication between an Ith access point and a Jth node from a packet length, an optimum packet type (length) and transmission/reception power provided in the communication between the Ith access point and the Jth node can be decided.

With reference to FIG. 3, it is for example, described an algorithm for gaining information for the number m of the interference instruments which perform the interference when the Ith access point executes a transmission and the Jth node performs a reception from the activity representative data of the sub network on the time Ti neighborhood, as follows.

When a change of an error rate is sensed in a transmission to the Ith access point and in a reception to the Jth node according to an existence and non-existence of the transmission/reception of specific nodes from the activity representative data of the sub network of Ti=0 and Ti=1, there exists an interference by the specific transmission/reception. Oppositely, when there is no change of the error rate in the transmission to the Ith access point and in the reception to the Jth node according to the existence and non-existence of the transmission/reception of the specific nodes, there does not exist the interference. Meanwhile, if a change width of the error rate is great according to the existence and non-existence of the transmission/reception of the specific nodes, the interference is great. In order to standardize an effect of the interference based on the existence and non-existence of the transmission/reception of the specific nodes, more definitely; preferably, there is no FEC(Forward Error Correction) or a little of the FEC in the test packet the Ith access point sends to compute the error rate of the Jth node, and when the Jth node transmits a result received under the interference or noise environment to the access point, the FEC becomes strong by maximum transmission power then is sent, to thereby lessen an error that the interference effect influences upon the computation of the error rate of the node in the reception of the Ith access point.

As above-described, the inventive method is embodied as a program and can be stored at a record medium such as CDROM, RAM, ROM, a floppy disk, a hard disk and an optical magnetic disk, etc. capable of being read through a computer.

As afore-mentioned, in accordance with the present invention, there is an effect of improving not only a performance of a subnet but also a performance of an overall network, by analyzing a wave environment of the subnet constructing the overall network, from an activity of a corresponding access point, thus, by reducing an interference between homogeneous or heterogeneous networks operating at the same frequency band.

It will be apparent to those skilled in the art that various modifications and variations can be made in the present invention without deviating from the spirit or scope of the invention. Thus, it is intended that the present invention cover the modifications and variations of this invention provided they come within the scope of the appended claims and their equivalents.

What is claimed is:

1. An adaptive wireless network system having a central optimizer in a system for embodying an adaptive wireless network through a use of the central optimizer, comprising:
   an optimizing unit for selecting optimum transmission/reception types of sub networks and transmitting them;
   an access point determining unit for providing subnet activity representative data which contain node activity representative data and activity representative data of access point itself, to said optimizing unit, and determining it as the optimum transmission/reception type; and
   a communication node determining unit for re-determining its own transmission/reception type according to a requirement of said access point determining unit.

2. The system as recited in claim 1, wherein said optimizing unit includes:
   a part for transferring a command for requiring the subnet activity representative data depending upon a time, to a plurality of access points;
   a part for selecting the optimum transmission/reception type of corresponding sub networks from the subnet activity representative data provided from the plurality of access points; and
   a part for providing the selected optimum transmission/reception type to the corresponding access points.

3. The system as recited in claim 2, wherein said subnet activity representative data depending upon the time, contain an information collection hour, an information collection time, a packet length of the access point and corresponding nodes, an existence and non-existence of a FEC (Forward Error Correction), power of a transmission and reception, and an error rate.

4. The system as recited in claim 2, wherein said selected optimum transmission/reception type contains a determination start hour, a determination completion time, the packet length of the access point and the corresponding nodes, the existence and non-existence of the FEC, the transmission power.

5. The system as recited in claim 2, wherein said part for selecting the optimum transmission/reception type has an algorithm for deciding an existence and non-existence of an interference through the transmission and reception of specific nodes, from a relation between an existence and non-existence for the transmission and reception of the specific nodes, and an error rate change width provided in a transmission to an Ith access point and a reception to a Jth node, through a comparison with the subnet activity representative data gained on the neighborhood of a specific hour.

6. The system as recited in claim 1, wherein said access point determining unit includes:
   a part for providing the node activity representative data from the corresponding nodes depending upon the time, and the activity representative data of the access point itself, to the central optimizer, by a requirement of the central optimizer; and
   a part for storing the optimum transmission/reception type at a wireless communication node in order to determine the wireless communication nodes on the basis of the optimum transmission/reception type provided from the central optimizer.

7. The system as recited in claim 1, wherein said communication node determining unit includes:
- a part for providing data for defining an activity type of node itself containing a reception signal strength, to a corresponding access point, according to a requirement of the access point determining unit; and
- a part for re-determining its own transmission/reception type information as the optimum transmission/reception type provided from the access point.

8. The system as recited in claim 1, wherein said optimum transmission/reception type includes the packet type containing the packet length and a transmission output of the access point and the wireless communication node.

9. The system as recited in claim 1, wherein said optimizing unit decides a transmission/reception type, containing the transmission power of the access point, reception power of the access point, an error rate of the access point, and a representative value for the transmission power, the reception power and the error rate of the communication nodes.

10. The system as recited in claim 7, wherein said packet length among the optimum transmission/reception types is optimized through a packet re-transmission probability and a packet transmission average time expressed as:

$$P\_retransmit = 1-(1-P(L=L_{ACESS}))^m(1-P(L=L_{ACK})^n$$

wherein P indicates a probability for a collision between a single bluetooth piconet and a radio LAN packet, $L=L_{ACESS}$ represents the packet length that the access point sends to, m provides the number of piconets for interfering when a wireless LAN node receives a packet having a length of $L_{ACESS}$ from the access point, $L=L_{ACK}$ provides a length of an ACK packet for confirming that the wireless LAN node received the packet, and n indicates the number of the piconets for interfering when the access point receives the packet having a length of $L_{ACK}$ from the wireless LAN node, $$AverageTime = s+k\ (headerTime+payloadTime\_k+P\_retransmit\ s+t)/(1-P\_retransmit)$$

wherein s indicates the sum of a DIFS time and a slot time SlotTime of 15 times, k represents a natural number, headerTime provides a time necessary for transmitting a header, payloadTime_k represents a time necessary for transmitting a payload k-divided from an original payload having a length of 1500 octet, t provides the sum of an SIFS time, a header time and a time necessary for transmitting an ACK, and P_retransmit furnishes a packet re-transmission probability.

11. A method for embodying an adaptive wireless network system having a central optimizer, comprising the steps of:
- a) selecting optimum transmission/reception types of sub networks, and transmitting them;
- b) providing subnet activity representative data containing node activity representative data and activity representative data of access point itself, to an optimizing unit, and determining it as an optimum transmission/reception type; and
- c) re-determining its own transmission/reception type according to a requirement of an access point determining unit.

12. The method as recited in claim 11, wherein said step a) includes the steps of:
- a1) transferring a command for requiring subnet wave use data depending upon a time, to access points;
- a2) selecting the optimum transmission/reception types of corresponding sub networks for an escape from an interference from the subnet wave use data provided by the access point; and
- a3) providing optimum transmission/reception type data to corresponding access points in order to determine a specific subnet as the selected optimum transmission/reception type.

13. The method as recited in claim 11, wherein said step b) includes the steps of:
- b1) providing the node activity representative data provided from corresponding nodes depending upon the time, and the activity representative data of access point itself, to the optimizing unit, by a requirement of the optimizing unit; and
- b2) determining wireless communication nodes as the optimum transmission/reception type provided from the optimizing unit.

14. The method as recited in claim 11, wherein said step c) includes the steps of:
- c1) providing data for representing an activity of node itself containing a reception signal strength according to a requirement of an access point determining unit; and
- c2) re-determining its own transmission/reception type.

15. A computer readable record medium having a writing of a program, in a wireless network system having an installment of a processor to embody an adaptive wireless network by using a central optimizer, said computer readable record medium characterized in that said programs is provided to realize the functions of:
- a) selecting optimum transmission/reception types of sub networks, and transmitting them;
- b) providing node activity representative data and activity representative data of access point itself to an optimizing unit, and determining it as an optimum transmission/reception type; and
- c) re-determining its own transmission/reception type according to a requirement of an access point determining unit.

* * * * *